March 5, 1957 P. D. BECKER 2,783,674
PAIR OF FLEXIBLY INTERCONNECTED SHEET METAL NUTS
Filed Sept. 1, 1953
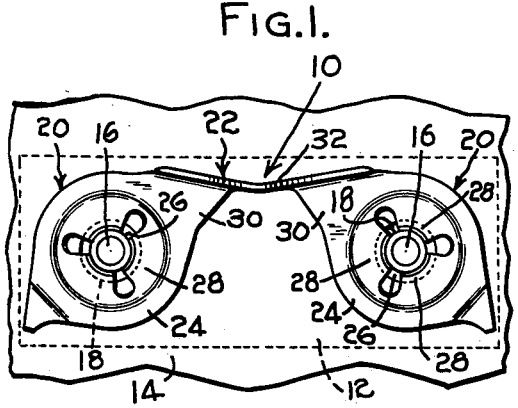
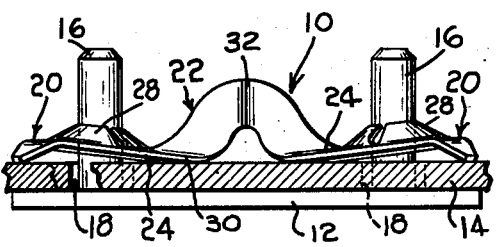
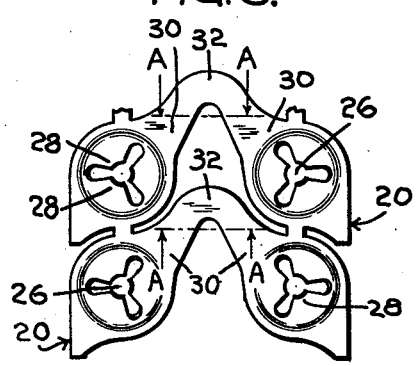
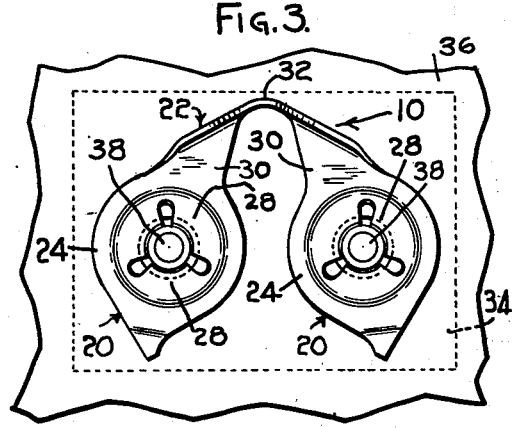
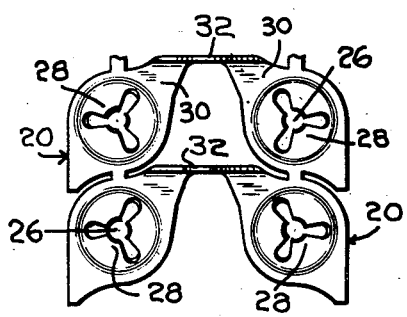
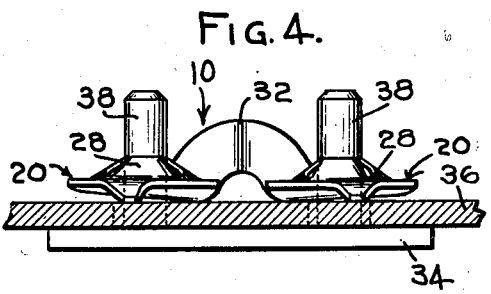
INVENTOR:
PHILIP D. BECKER,
BY *Robert E Ross*
ATTORNEY.

2,783,674

PAIR OF FLEXIBLY INTERCONNECTED SHEET METAL NUTS

Philip D. Becker, Hingham, Mass., assignor, by mesne assignments, to United-Carr Fastener Corporation, Boston, Mass., a corporation of Delaware Application September 1, 1953, Serial No. 377,876

1 Claim. (Cl. 85—36)

This invention relates generally to fastening devices, and has particular reference to a fastener for engaging a pair of spaced studs protruding through panel openings.

In the manufacture of automobiles, refrigerators, and the like, it is frequently desired to attach an ornament to a panel by means of studs extending from the back of the panel through suitably spaced panel openings. It has been common practice to secure the studs in the openings by means of sheet metal nuts, which are pushed over the end of the stud with resilient tongues to dig into engagement therewith and seat against the panel.

Since most ornaments of this type are provided with at least two attaching studs, it has been considered desirable to provide a single fastening device with means for engaging both studs to reduce the labor cost of the assembly. However, such fastening devices have been generally unsatisfactory since the distance between the studs may vary slightly, so that the fastener does not engage each stud equally well.

The object of the invention is to provide a fastening device which is adapted to engage a pair of spaced studs, in which means is provided to vary the distance between the stud-engaging portions.

Another object of the invention is to provide a fastening device for assembly onto a pair of spaced studs in which a pair of stud-engaging portions are joined by a resilient connecting portion.

Other objects of the invention will, in part, be obvious, and will, in part, appear hereinafter.

In the drawing:

Fig. 1 is a top plan view of a fastening device embodying the features of the invention;

Fig. 2 is a view in side elevation of the fastener assembly of Fig. 1;

Fig. 3 is a top plan view of the fastening device assembled onto a pair of studs spaced apart a distance substantially less than the studs of Fig. 1;

Fig. 4 is a view in side elevation of the assembly of Fig. 3;

Fig. 5 is a top plan view of a strip of fastener blanks illustrating one step in the manufacture thereof; and Fig. 6 is a top plan view of a strip of fasteners illustrating another step in the manufacture thereof.

Referring to the drawing, there is illustrated a fastening device 10, which is particularly adapted for retaining a device 12 such as an ornament or the like onto a panel 14.

The device 12 is provided with a pair of rearwardly extending studs 16 which extend through suitable apertures 18 in the panel and protrude from the rear side thereof and may be formed of steel, die casting metal, plastic, or other suitable material.

The fastener 10 is formed of a single piece of resilient sheet metal, and comprises a pair of spaced stud-engaging portions 20 and a connecting portion 22 extending therebetween. The stud-engaging portions 20 each comprises a base 24, a stud-receiving aperture 26 disposed centrally therein, and a series of resilient upwardly inclined tongues 28 disposed about the opening.

The connecting portion 22 comprises end portions 30 which extend from the bases 24 at an acute angle to a base line drawn between the centers of the stud-receiving apertures and join a medial portion 32 disposed in spaced relation to the base line. The medial portion 32 is bent upwardly to extend substantially perpendicularly to the general plane of the bases of the stud-receiving portions.

The fastener is readily formed from a continuous strip of sheet metal in automatic machinery. As shown in Fig. 5, the shape of the fastener blanks as formed permits them to nest together so that they require no more metal than if the connecting portion extended directly between the stud-engaging portions. As shown in Fig. 6, the medial portion 32 of the connecting portion 22 is then bent upwardly along the line A—A to extend substantially perpendicular to the general plane of the fastener. After forming, the fasteners may be separated from the strips in the usual manner.

The flexible medial portion 32 permits the stud-engaging portions to be moved relative to each other to enable the fastener to be assembled onto studs spaced apart various distances. In Figs. 1 and 2, the stud-engaging portions are spread apart to conform to the stud spacing. In Figs. 3 and 4, there is shown a similar assembly comprising an ornament 34 assembled onto a panel 36 by means of a pair of studs 38 which are considerably closer together than the studs in Figs. 1 and 2, so that the stud-engaging portions of the fastener must be flexed together to conform to the stud spacing.

The fasteners are readily assembled onto a pair of studs by flexing the medial portion until the spacing of the stud-engaging portions conforms to that of the studs, and then forcing them onto the studs until the bases 24 bear against the panel, with the inclined tongues flexing upwardly and biting into the surface of the stud.

The flexibility of the medial portion permits the stud-engaging portions to adjust themselves into the exact spacing of the studs during assembly, thereby insuring that each stud will be engaged equally well.

Since certain obvious changes may be made in the device without departing from the scope of the invention, it is intended that all matter contained herein be interpreted in an illustrative and not in a limiting sense.

I claim:

A fastening device for assembly onto a pair of spaced studs, said fastener being formed of a single piece of resilient sheet metal and comprising a pair of laterally spaced stud-engaging portions and a flexible connecting portion extending along one side only therebetween, each of said stud-engaging portions comprising a base having a central stud-receiving aperture and means disposed about the aperture for engaging a stud inserted therethrough, said connecting portion having end portions extending angularly in relation to a line joining said stud-engaging portions and intersecting in spaced relation to said line, the medial portion of said connecting portion being disposed substantially perpendicular to the plane of the base of the stud-engaging portions and extending in the direction of the free end of each stud, said medial portion being spaced from a line connecting said stud-engaging portions, whereby said stud-engaging portions may be moved toward and away from each other by flexing of said connecting portion.

References Cited in the file of this patent

UNITED STATES PATENTS

| Re. 21,769 | Tinnerman | Apr. 8, 1941 |
| 1,697,317 | Kyle | Jan. 1, 1929 |
| 1,907,506 | Coburn | May 9, 1933 |
| 2,157,641 | Tinnerman | May 9, 1939 |
| 2,385,777 | Ebert | Oct. 2, 1945 |
| 2,421,201 | Hallock | May 27, 1947 |
| 2,646,714 | Tinnerman et al. | July 28, 1953 |